US012647041B2

(12) United States Patent
Schnabel et al.

(10) Patent No.: US 12,647,041 B2
(45) Date of Patent: Jun. 2, 2026

(54) POWER ELECTRONICS SYSTEM

(71) Applicant: MAGNA Powertrain GmbH & Co KG, Lannach (AT)

(72) Inventors: Thomas Schnabel, Asten (AT); Eike Janssen, Linz (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 134 days.

(21) Appl. No.: 18/852,577

(22) PCT Filed: Feb. 2, 2023

(86) PCT No.: PCT/EP2023/052576
§ 371 (c)(1),
(2) Date: Sep. 30, 2024

(87) PCT Pub. No.: WO2023/186374
PCT Pub. Date: Oct. 5, 2023

(65) Prior Publication Data
US 2025/0226759 A1     Jul. 10, 2025

(30) Foreign Application Priority Data

Apr. 1, 2022    (DE) ..................... 10 2022 203 300.0

(51) Int. Cl.
*G06F 1/16*          (2006.01)
*H02M 7/00*          (2006.01)
(Continued)

(52) U.S. Cl.
CPC .................................. *H02M 7/003* (2013.01)

(58) Field of Classification Search
CPC .... H05K 2201/10272; H05K 7/14329; H02M 7/003; H02M 7/42; H02M 7/02; H02M 11/00
See application file for complete search history.

(56) References Cited

U.S. PATENT DOCUMENTS 6,559,532 B1 *   5/2003   Schwarzbauer ...... H02M 5/297
257/691
2014/0085955 A1 *  3/2014   Maeda .................. H02M 7/003
363/132

(Continued)

FOREIGN PATENT DOCUMENTS

DE      102017115883 A1      1/2019
DE      102020111574 B3      7/2021
(Continued)

OTHER PUBLICATIONS

European Patent Office, Rijswijk, Netherlands, International Search Report of International Application No. PCT/EP2023/052576, Mailed May 10, 2023, 2 pages.

*Primary Examiner* — Anthony M Haughton
(74) *Attorney, Agent, or Firm* — Dickinson Wright PLLC

(57) ABSTRACT

A power electronics system includes at least one power module which is connected to a direct-current source via an upper bus bar and a lower bus bar. The at least one power module has connection points for contact with the bus bars, and the upper bus bar rests on an insulating sheet and on the lower bus bar. The upper bus bar has a cut-out and the insulating sheet has a further cut-out, so that the lower bus bar is accessible from above.

14 Claims, 1 Drawing Sheet

(51) Int. Cl.
    *H05K 5/00*         (2025.01)
    *H05K 7/00*         (2006.01)

(56)           References Cited

U.S. PATENT DOCUMENTS

| | | | | |
|---|---|---|---|---|
| 2017/0040586 | A1* | 2/2017 | Shimizu | H01G 4/228 |
| 2018/0183349 | A1* | 6/2018 | Kadota | H02M 7/003 |
| 2020/0091488 | A1* | 3/2020 | Zeng | H01M 50/51 |
| 2021/0013148 | A1* | 1/2021 | Tønnes | H10W 20/427 |
| 2021/0078446 | A1* | 3/2021 | Wang | H02M 7/003 |
| 2021/0159806 | A1* | 5/2021 | Kobayashi | H02M 1/00 |
| 2023/0009758 | A1* | 1/2023 | Reiter | H02M 7/003 |
| 2023/0253891 | A1* | 8/2023 | Mühlfeld | H03K 17/12 |
| | | | | 363/123 |
| 2024/0014517 | A1* | 1/2024 | Ikeda | H01M 50/572 |

FOREIGN PATENT DOCUMENTS

| | | | |
|---|---|---|---|
| DE | 102020127036 | A1 | 4/2022 |
| EP | 3267571 | A1 | 1/2018 |

* cited by examiner

POWER ELECTRONICS SYSTEM

CROSS-REFERENCE TO RELATED APPLICATIONS

This application is a National Stage of International Application No. PCT/EP2023/052576, filed on Feb. 2, 2023, which claims priority to DE 10 2022 203 300.0 filed on Apr. 1, 2022. The entire disclosures of each of the above applications are incorporated herein by reference.

FIELD

The invention relates to a power electronics system including at least one power module which is connected to a DC source via an upper busbar and a lower busbar, wherein the at least one power module has connection points for making contact with the busbars, and wherein the upper busbar rests on an insulating film and on the lower busbar.

BACKGROUND

This section provides information related to the present disclosure which is not necessarily prior art.

Electric vehicles (EVs) and hybrid electric vehicles (HEVs) are the fastest-growing and most demanding market for power electronics components. Power density, reliability and cost are the most important factors for vehicle applications.

Due to the high battery costs and the need to increase the range of electric vehicles, efficiency is a key focus of new developments. SiC-MOSFET inverters with DC link voltages of up to 800V are being used for large electric vehicles.

Extremely high peak currents, fast switching transients, maximum reliability and fast assembly, as well as low installation space requirements, necessitate a minimum leakage inductance of the power module and the matching DC link capacitor as well as connection technologies such as chip sintering and laser welding for the main current connections with simultaneous overlapping of the connections.

DE 10 2017 115 883 B4 describes a system with a power module which has a switching device with a substrate and conductor tracks arranged thereon. The submodule has a first and a second DC voltage conductor track and a first and a second DC voltage connection element connected thereto in a polarity-correct and electrically conductive manner, as well as an AC voltage conductor track and an AC voltage connection element connected thereto in a polarity-correct and electrically conductive manner. The sub-module also has a molded insulating body that encloses the switching device like a frame. In this case, the first direct voltage connection element rests with a first contact portion on a first support body of the molded insulating body, while the alternating voltage connection element rests with a second contact portion on a second support body of the molded insulating body. A first clamping device is designed to pass through a first recess of the first support body in an electrically insulated manner and to form an electrically conductive clamping connection between the first DC voltage connection element and an associated first DC voltage connection element, as well as between the second DC voltage connection element and an associated second DC voltage connection element, and a second clamping device is designed to pass through a second recess of the second support body in an electrically insulated manner and to form an electrically conductive clamping connection between the AC connection element and an associated AC voltage connection element. Furthermore, the first and second DC voltage connection elements with an insulation device arranged between them form a stack at least in one portion.

A power module is also known from the publication "SiC automotive power module with laser welded, ultra low inductive terminals and up to 900 Arms phase current" CIPS 2022, ISBN 978-3-8007-5757-2 @ VDE VERLAG GMBH•page 39ff.

It has no screw-type power connections, but all high-power connections are located inside the module on the substrate and all connections to the busbars are laser-welded for an output current of up to 900 A. The DC connection consists of two busbars, one above the other, which are insulated by a plastics housing. The clearances and creepage distances are sufficient for a maximum DC link voltage of 1000V in accordance with automotive requirements LV123 and IEC 60664-1.

The lower DC negative terminal is wider than the upper DC positive terminal, which enables the welding process to be completed in a single assembly step. While the upper terminal has the welding zone in the middle, the lower terminal has two welding zones on the sides of the upper busbar.

DE 10 2020 111 574 B3 discloses an arrangement of conductor tracks on an inverter. The conductor tracks extend over a base plate, wherein the upper conductor track has an opening in the region of the base plate. The conductor tracks are welded through this opening and through a corresponding opening in the insulating film.

DE 10 2020 127 036 A1 shows a connection arrangement between busbars. A frame structure made of insulating material sits on the upper busbar and frames an opening in the busbar and the insulating film. The connection is made by laser welding in the region of a carrier plate.

SUMMARY

This section provides a general summary of the disclosure and is not a comprehensive disclosure of its full scope or all of its features.

The object of the present disclosure is to create a power electronics system in a confined installation space with stacked connections that is easily accessible for connection operations of the power module.

The object is achieved with a power electronics system comprising at least one power module which is connected to a DC power source via an upper busbar and a lower busbar, wherein the at least one power module has connection points for making contact with the busbars, wherein the upper busbar rests on an insulating film and on the lower busbar, and the upper busbar has a cut-out and the insulated film has a further cut-out so that the lower busbar is accessible when viewed from above.

By arranging the DC connections one above the other, the leakage inductance can be reduced to a minimum.

By inserting a window, i.e., a bushing in the upper busbar, the busbar can be connected to a lower connection point.

An insulating part is installed between the insulating film and the lower busbar for this purpose.

It is advantageous for assembly that the power module has an upper connection point on the surface of the power module and a lateral connection point on one end face of the power module.

This allows the two busbars to be connected from the same direction as seen from above on the power module.

The upper busbar is connected to the upper connection point in an integrally bonded manner.

The insulating part has a base surface with an opening that corresponds to the dimensions of the cut-outs.

The openings can have any cross-section: round, rectangular, etc.

The opening of the insulating part is surrounded by a frame that protrudes through the cut-outs in the insulating film and the upper busbar.

The lower busbar is connected to the lateral connection point of the power module.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Figure 1:
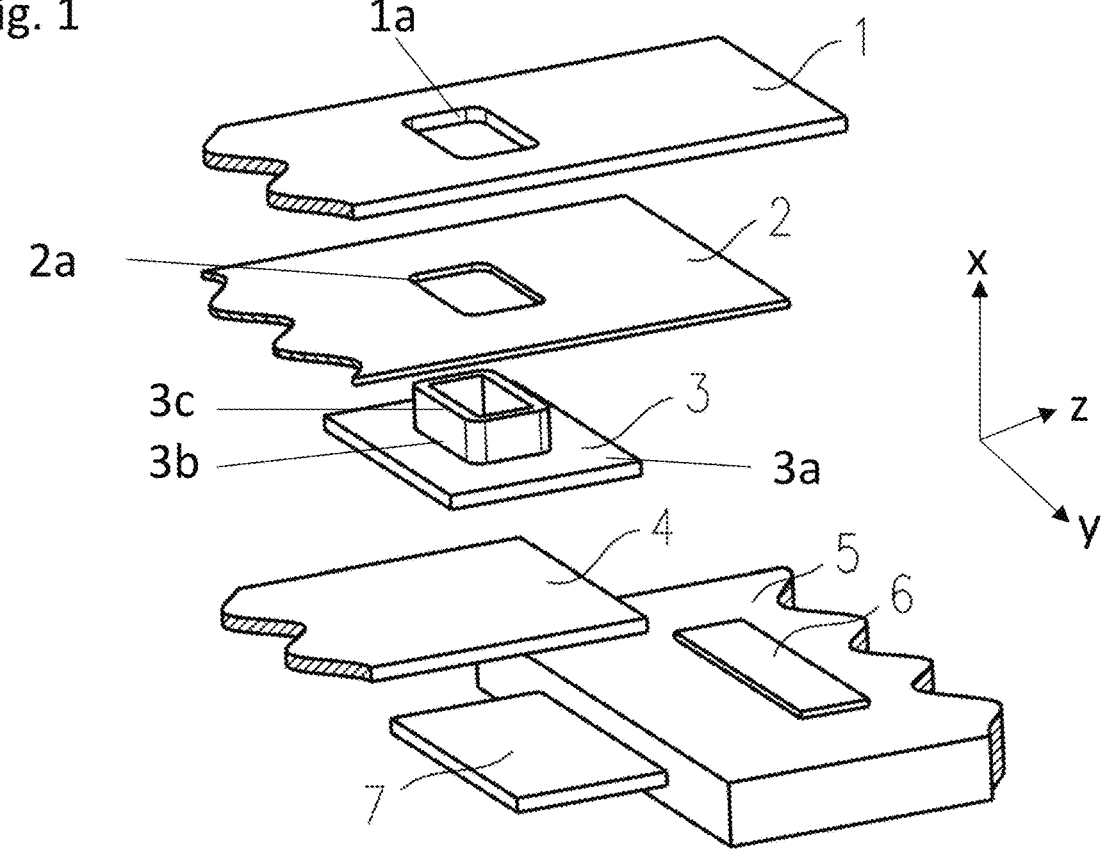
FIG. 1 shows an exploded view of one embodiment.
Figure 2:
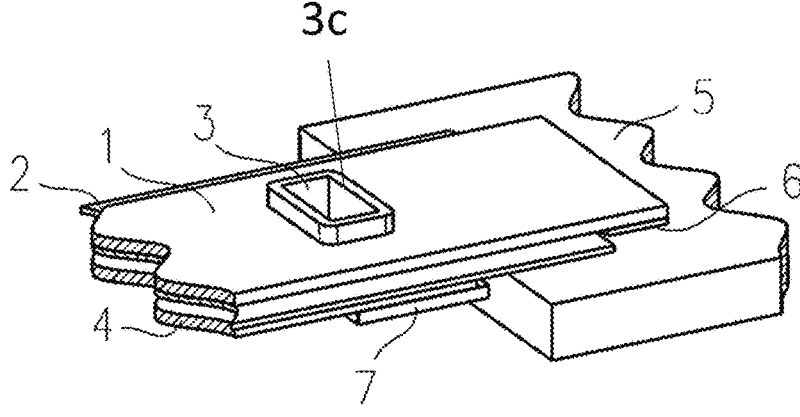
FIG. 2 shows an assembly of the exemplary embodiment.
Figure 3:
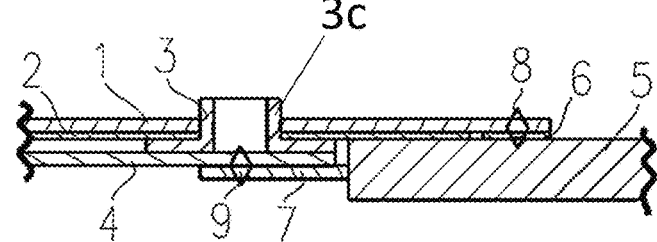
FIG. 3 shows a section through the exemplary embodiment.

DETAILED DESCRIPTION power electronics system 10 is built around a power module 5 and includes the application-specific components beyond the power module 5. This includes busbars as connections, the AC output connections, the cooling system, and installation in a housing.

The power module 5 is specially designed in that it has an upper connection point 6 on its flat surface and a lateral connection point 7 on one of its end faces.

The two connection points 6, 7 are used to connect the power module to an upper busbar 1 and a lower busbar 2 in an integrally bonded manner. The upper busbar 1 rests on the upper connection point 6 of the power module and makes contact via an upper busbar connection point 8. The lower busbar 4 rests on the lateral connection point 7 and makes contact via a lower busbar connection point 9.

The two busbars 1 and 4 lie directly above each other in the x-direction, wherein they are flush with each other along their y-direction, the longitudinal extent.

In the exemplary embodiment, an insulating film 2 is provided between the two busbars and extends away from the upper connection point 6. The insulating film 2 has a cut-out 2a, which corresponds to a cut-out 1a in the upper busbar 1. The insulating film 2 is fitted in such a way that the two cut-outs 1a and 2a are directly above each other.

An insulating part 3 is provided separately in this exemplary embodiment. It has a base surface 3a with an opening 3b, which is surrounded by a frame 3c. The frame 3c is adapted to the cut-outs 1a and 2a in such a way that the frame 3c is inserted through the upper busbar 1 and the insulating film 2. In this embodiment, the frame 3c is selected high enough to protrude above the surface of the upper busbar 1 even after the components have been assembled. However, it can also be so high that it is flush.

The insulating film 2, which is placed between the two busbars anyway, can be designed in such a way that this insulating film also includes the function of the insulating part.

In an alternative embodiment, the insulating part 3 and the insulating film 2 are made in one piece. The insulating part has a thickness that fills the air gap between the busbars 1, 4.

To connect the busbars 1 and 4, the stacked structure is placed on the power module. Both busbars are connected from above in the x-direction, wherein the lower busbar 4 is connected through the opening 3a and the cut-outs 1a and 2a at the lower connection point 8.

Accessibility for the joining technology such as welding, soldering, press-fitting, screwing, riveting, sintering, etc. is possible by providing the opening in the upper busbar.

The opening makes it possible to produce the lower connection point 9 of the bottom busbar 4 with the power module 5 and, at the same time, to produce the upper connection point 8 of the busbar 1, which is already accessible from above, with the power module 5. On the one hand, this enables a space-saving assembly of the components and offers potential for optimizing the manufacturing process, as the connection process can be carried out in one clamping operation.

By inserting an insulating part, the necessary air and creepage distances are maintained depending on the requirements and the size of the window and thus the leakage inductance are minimized.

By subsequently covering the opening with an insulating element, which is not shown, a further improvement in leakage inductance can be achieved.

LIST OF REFERENCE SIGNS 1 upper busbar
1a cut-out
2 insulating film
2a cut-out
3 insulating part
3a base surface
3b opening
3c frame
4 lower busbar
5 power module
6 upper connection point
7 lateral connection point
8 upper busbar connection point
9 lower busbar connection point
10 power electronics system

What is claimed is:

1. A power electronics system comprising:

at least one power module, a DC power source connected to the at least one power module, an upper busbar connecting the at least one power module to the DC power source, and a lower busbar connecting the at least one power module to the DC power source, wherein the at least one power module includes connection points that make contact with the upper and lower busbars, wherein the upper busbar rests on an insulating film and on the lower busbar, wherein the upper busbar includes a cut-out and the insulating film includes a further cut-out, such that the lower busbar is accessible when viewed from above, wherein an insulating part is disposed between the insulating film and the lower busbar, wherein the insulating part has a base surface with an opening defined by a frame projecting from the base surface, which corresponds in dimension to the cutouts, and the opening of the insulating part is surrounded by the frame which projects through the cutouts of the insulating film and the upper busbar, wherein the base surface of the insulating part has a thickness which fills an air gap between the busbars.

2. The power electronics system as claimed in claim 1, wherein the power module has an upper connection point on an upper surface of the power module and a lateral connection point on an end face of the power module.

3. The power electronics system as claimed in claim 2, wherein the upper busbar is connected to the upper connection point in an integrally bonded manner.

4. The power electronics system as claimed in claim 2, wherein the lower busbar is connected to the lateral connection point of the power module.

5. The power electronics system as claimed in claim 1, wherein the insulating film and the insulating part are in one piece.

6. The power electronics system as claimed in claim 1, wherein the opening has a cover.

7. The power electronics system as claimed in claim 2, wherein the insulating film is disposed on an upper surface of the power module adjacent the upper connection point and extends away from the upper connection point.

8. The power electronics system as claimed in claim 1, wherein insulating part is separate from the insulating film.

9. The power electronics system as claimed in claim 8, wherein the base surface extends laterally outward relative to the frame, such that the base surface is disposed above the lower busbar and below the insulating film, with the frame projecting upwardly through the cutouts of the insulating film and the upper busbar.

10. The power electronics system as claimed in claim 1, wherein the frame of the insulating part protrudes above the upper busbar.

11. The power electronics system as claimed in claim 2, wherein a lower busbar connection point is accessible through the opening defined by the frame, such that the lower busbar connection point is producible from above.

12. The power electronics system as claimed in claim 11, wherein an upper busbar connection point is accessible at an upper surface of the upper busbar, such that the upper busbar connection point is producible from above.

13. The power electronics system as claimed in claim 2, wherein the upper connection point and the lateral connection point are accessible from the same direction.

14. The power electronics system as claimed in claim 2, wherein a stack of the upper busbar, the insulating film, the insulating part, and the lower busbar is placed above both the upper connection point and the lateral connection point of the power module, such that both the upper and lower busbars are connected to the power module from above.

* * * * *